Aug. 27, 1929.                F. A. BENFORD                1,726,379
                              LIGHT PROJECTOR
                           Filed Nov. 30, 1925          4 Sheets-Sheet 1

Inventor
Frank A. Benford

Aug. 27, 1929.　　　F. A. BENFORD　　　1,726,379
LIGHT PROJECTOR
Filed Nov. 30, 1925　　　4 Sheets-Sheet 2

Inventor:
Frank A. Benford

Aug. 27, 1929.  F. A. BENFORD  1,726,379
LIGHT PROJECTOR
Filed Nov. 30, 1925  4 Sheets-Sheet 3

Inventor:
Frank A. Benford

Aug. 27, 1929.   F. A. BENFORD   1,726,379
LIGHT PROJECTOR
Filed Nov. 30, 1925    4 Sheets-Sheet 4

Inventor:
Frank A. Benford

Patented Aug. 27, 1929.

1,726,379

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

LIGHT PROJECTOR.

Application filed November 30, 1925. Serial No. 72,127.

This invention relates to light projectors having a reflector made up of a number of small mirrors or reflecting surfaces. The object of the invention is to provide an improved arrangement and proportioning of the elements of such a sectional reflecting surface; to provide a reflector in which the individual mirrors or reflecting surfaces are arranged in such a way with respect to or about a focalizing surface such as a paraboloid that the composite beam resulting from the merging of a multitude of individual beams will be free from images, and highly uniform in intensity.

More particularly the object of the invention is to provide a reflector made up of a plurality of flat reflecting surfaces or sections adjusted to be in internal contact with a conoid (i. e. ellipsoid, paraboloid or hyperboloid); the length and width of said sections being so chosen that the divergence of the rays is substantially equal for all sections.

Figure 1:
Figure 2:
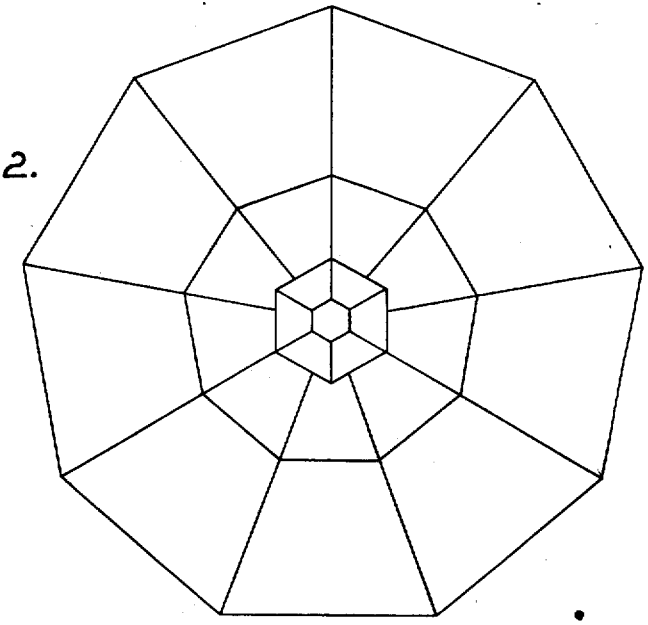
Figure 3:
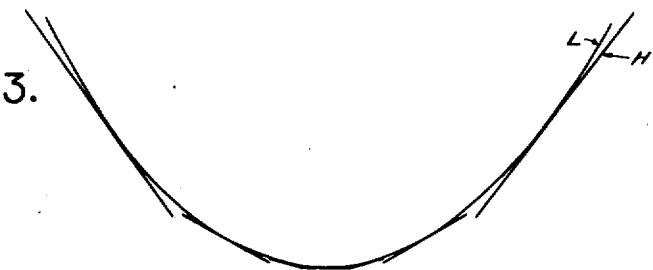
Figure 4:
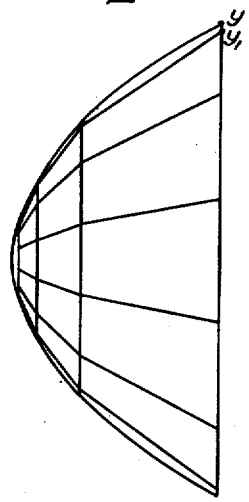
Figure 5:
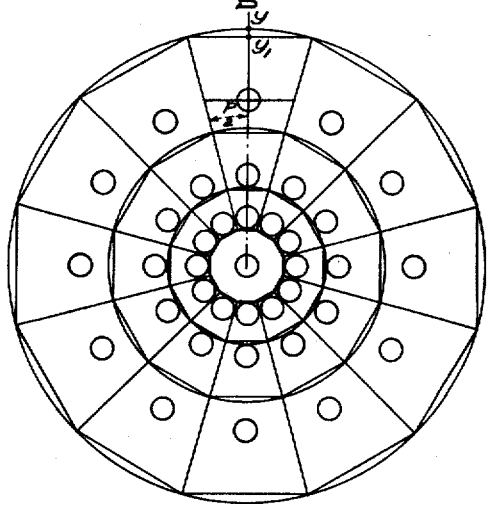
Figure 6:
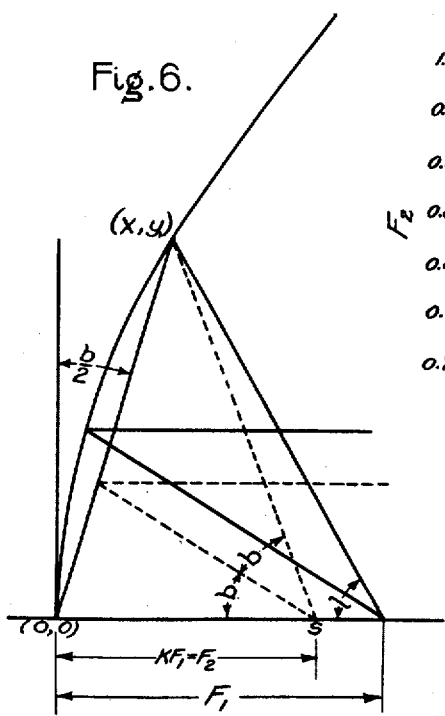
Figure 7:
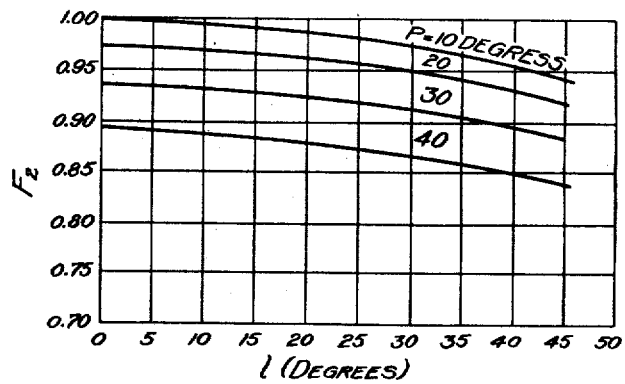
Figure 8:
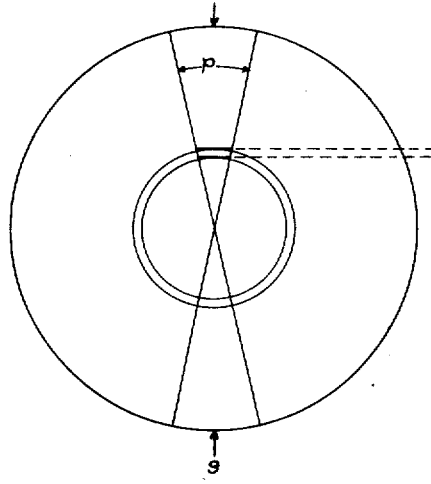

The invention will be more fully understood from the following specification in which the invention is more fully set forth and claimed, reference being had to the accompanying drawings in which Fig. 1 shows curves giving the relation between angular width of light source and the generating angle for use in determining the sections of a sectional mirror, the curve marked "Major axis" being intended for use with a spherical source and the one marked "Minor axis" being intended for use with a disk-shaped source; Fig. 2 is a front view of one form of the projector of the invention showing the sections of the reflector; Fig. 3 is a section of a reflector in which the mirror sections are shown in tangential relation to a conicoid. In this figure open joints are seen which is not a desirable form of construction. Fig. 4 is a side view of a modified form of the invention; Fig. 5 is a front view of the same device indicating the image formation of the light source in each section; Fig. 6 shows a conicoid designed to pass through the meridian center of the mirror sections. In this particular instance the conicoid is a paraboloid. In Fig. 7 several curves are given showing the relation of $F_2$ to $l$ degrees where $F_2$ is the derived position for the light source to produce an equal spread from both ends of the longitudinal axis of a section and where $l$ is the angular dimension of the longitudinal center line and $p$ is the angle between the meridian planes forming the edges of the mirror sections; Fig. 8 is a drawing showing a sine correction for the angle between meridian planes used in determining the angular length of the transverse axis of any mirror section which angular length $$w = p \text{ sine } a;$$

Figure 9:
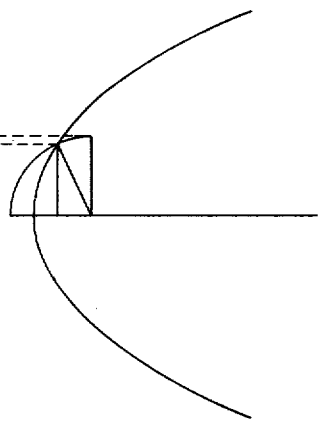
Figure 10:
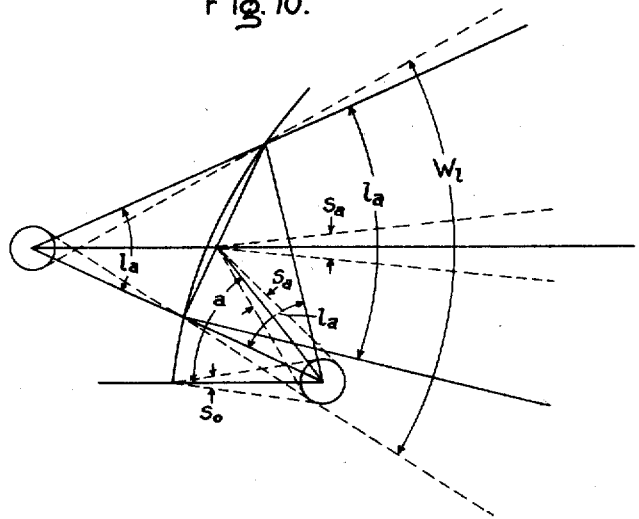
Figure 11:
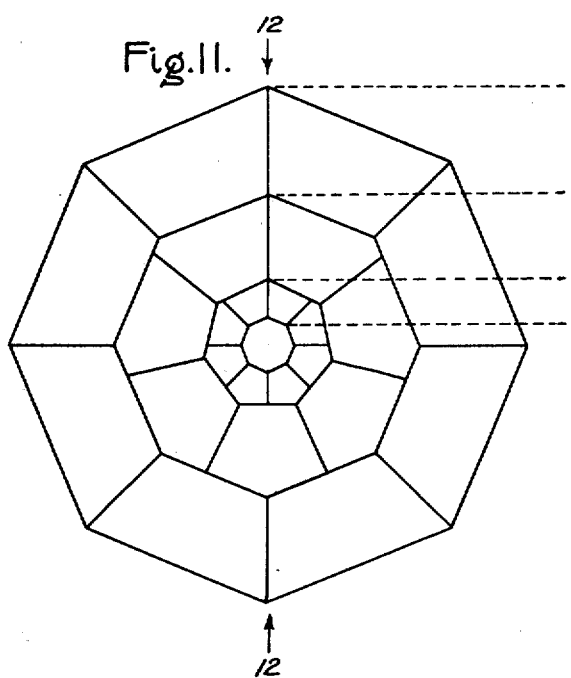
Figure 12:
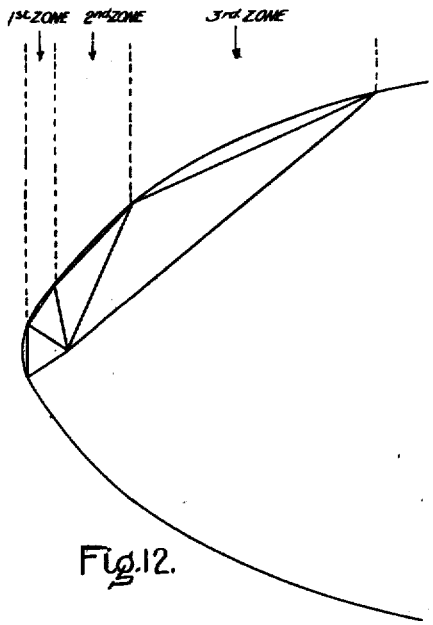
Figure 14:
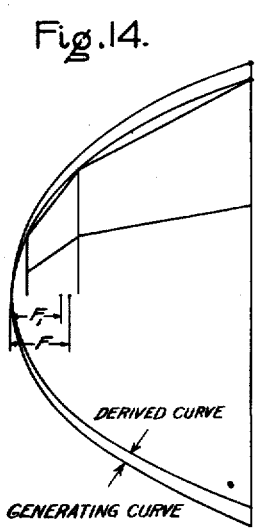
Figure 13:
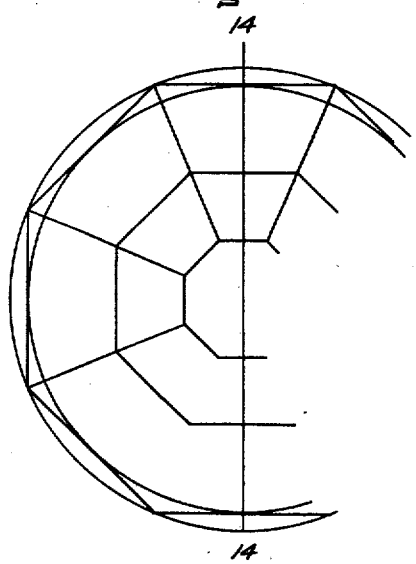

Fig. 9 is a sectional view through line 9—9; Fig. 10 is a drawing illustrating how the angles are added; Fig. 11 shows a front view of a modified form of the projector of my invention; Fig. 12 shows a section taken along line 12—12, Fig. 11; Fig. 13 is a front view of a sectional mirror; and Fig. 14 is a section on line 14—14, Fig. 13, showing the focal point F of the original conicoid and showing also $F_1$, the focal point of the conicoid passing through the ends of the meridian central lines.

*Nature of the beam from a sectional mirror.*

The striking features of a beam from a sectional mirror are its softness of outline, uniformity of intensity, and relative freedom from images of the source. These features are often of extreme value, but they are attained at the expense of beam strength, so that to the above features might be added that of low intensity and a wide angle of spread. The projection efficiency is ordinarily high, therefore for short range projection the floodlight built on the sectional plan stands without a superior. The beam formation takes place in a manner radially different from the parabolic and hyperbolic beams and as the analysis of the beam involves new points of view, it is necessary to begin a survey of the subject with the very elements of reflection by a plane mirror, and by some process of summation arrive at the beam from the complete reflector.

The various beams of the conic family have one point in common:—they come from a single real or virtual image. The sectional beam however radiates from a multitude of images and the whole beam therefore is composed of a multitude of individual beams that, at a sufficient distance merge into one.

*The unit beam.*

Each flat section of mirror in the sectional mirror reflects an independent beam of light whose cross section resembles the outline of the section of mirror and whose strength in candles is proportional to the intensity of radiation from the source in the direction of the plane mirror in question. Let this intensity of radiation from the extended source be $I_a$, and let the coefficient of reflection of the mirror be K, then the strength $I_e$ of the elemental beam is $$I_e = KI_a \text{ candles} \quad (357)$$

If the centers of the elemental beams are substantially parallel then at some distance they will all overlap and, adding the direct radiation of the lamp, the combined beam strength is $$I = \Sigma KI_a + I_{180} \text{ candles} \quad (358)$$

Thus with a source giving 1000 candles uniformly in all directions, and a 36-section mirror of glass having a coefficient of 0.85, the beam strength is $$I = 36 \times 0.85 \times 1000 + 1000 = 31,600 \text{ candles}$$

of which 30,600 is the strength of the reflected light and 1000 is direct radiation from the source. Fig. 5 is a drawing of such a sectional mirror with the light source in the center and the 36 images in the 36 sections arranged in three concentric circles. In this actual case the intensity of radiation is not equal in all directions about the source, and the direct radiation along the axis of the beam is far below the average, as is clearly indicated in the figure. In computing this beam each zone of mirrors must be used in connection with the correct intensity as shown by the distribution curve of the lamp, and for this reason the summation indicated in Equation (358) is more than a simple counting of sections.

*Conditions for maximum beam uniformity.*

(*1*) *Spherical source.*—A condition that might be regarded as of prime importance is the attainment of a high degree of uniformity at all points in the strength of the beam. The beam from a paraboloid ordinarily has a center of nearly uniform intensity, the crest, but the beams from ellipsoids and hyperboloids are always most intense in the center with gradually decreasing strength toward the edge. As these latter reflectors are the ones often used when great beam width is desired, the common form of a wide beam is far from uniform. It is in this particular field that the sectional mirror is most useful and it is here proposed to point out what physical proportions will produce the greatest degree of beam uniformity. For practical purposes the computations of the angular dimensions of the sections of a sectional mirror need not be carried out with exactness. Approximations are sufficient. This condition allows a number of simplifications to be made in the formulas, all of which do not follow orthodox lines. An attempt to follow a rigid mathematical treatment soon leads to such complicated forms as to discourage the most conscientious designer, and therefore the simple forms here given may be of far greater practical use. Obviously, the width $W_1$, of the beam from a single mirror measured in a meridian plane, is equal to the angular length, $l$, of the mirror, plus the angular width $s$ of the source as measured from the center of the section. This may be expressed as follows:

$$W_1 = l + s \text{ degrees} \quad (359)$$

This equation is, of course, a general equation. As applied to a specific instance of a panel having its center at an angle of $a$ degrees from the axis of the reflector, the equation becomes—

$$W_1 = l_a + s_o \cos^2 \frac{a}{2}$$

In Fig. 10 the angle subtended by the source and indicated by $$s_o \cos^2 \frac{a}{2}$$

in the above equation is abbreviated to $s_a$ and in this figure the width that has been added to the reflected beam by the size of the source is indicated by the dotted lines drawn tangent to the image and by the symbol $W_1$.

If the edges of the section are formed by meridian planes, spaced $p$ degrees as indicated in Fig. 8, then the angular width, $w$, (=sagittal angle the apex of which lies at the focal point) of a section whose center is at the angle $a$ on the generating parabola is $$w = p \sin a \text{ degrees} \quad (360)$$

and the width of the reflected beam is $$W_w = p \sin a + s \text{ degrees} \quad (361)$$

The first apparent condition for maximum uniformity is then $$W_1 = W_w \text{ degrees} \quad (362)$$

If the light source is spherical, and of width $s_o$ degrees as measured from the vertex of the paraboloid then at any angle $a$ Equations (359) and (362) must give identical values—

$$l_a + s_o \cos^2 \frac{a}{2} = p \sin a + s_o \cos^2 \frac{a}{2} \text{ degrees} \quad (363)$$

and this equation is then the basis for finding the proportions of the various sections. To have the width $W_1$ equal at the generating center angles, $a$, $b$, $c$, etc. we have $$W_i = l_a + s_o \cos^2 \frac{a}{2}$$
$$= l_b + s_o \cos^2 \frac{b}{2} \text{ degrees} \quad (364)$$
$$= l_c + s_o \cos^2 \frac{c}{2}$$

etc. and the corresponding widths of sections to give equal beam width $W_w$ are found from $$W_w = p_a \sin a + s_o \cos^2 \frac{a}{2}$$
$$= p_b \sin b + s_o \cos^2 \frac{b}{2} \text{ degrees} \quad (365)$$
$$= p_c \sin c + s_o \cos^2 \frac{c}{2}$$

To take a specific case let us assume that a beam of forty-five degrees width is desired, and that the spherical light source subtends an angle of fifteen degrees from the vertex of the generating paraboloid or $$s_o = 15 \text{ deg.}$$

The vertex of the paraboloid may be covered by a single mirror cut in a polygonal form so that its angular diameter is $$= 45 - 15 = 30 \text{ deg.}$$

The second zone of mirrors then starts at 15 deg. from the axis, and we may assume that the center of the zone will be at 30 deg. from the axis. From Equation (364)

$$45 \text{ deg.} = l_b + 15 \cos^2 15°$$

or $$l_b = 45 - 14 = 31 \text{ deg.}$$

The inner edge of the third zone is at $$15 + 31 = 46 \text{ deg.}$$

and again we assume some value $l_c$ so as to make the second correction in $s_o$ for the varying angle formed by the source.

Take $l_b = 32$ deg., then the center of the third zone is at $46 + 16 = 62$ deg. and $$45 = l_c + 15 \cos^2 31°$$
$$l_c = 45 - 11 = 34°$$

The inner edge of the fourth zone is at $$46 + 34 = 80 \text{ deg.}$$

and the length of this zone may be estimated at 36 deg. and Equation (364) used again to determine $l_d$.

These successive approximations may be made by the aid of Fig. 1 where the angle subtended by a spherical source of diameter 1 deg. as measured from the vertex is plotted to show the relation between $s$ and the generating angle $a$. Thus, at 0 deg. the source in the above example contributes 15 deg. to the beam width, but at 90 deg. the added width is 7.5 deg. and at 120 deg. only 3.75 deg. With these corrections made all zones will give nearly the same width of beam. Two factors have been omitted in thus computing the beam width. These are the added width due to the corners of the sections extending out farther than the ends of the two center lines, and the decreased width due to the application of the ten percent rule to the determination of the edges of the soft edged beam. These two factors are opposed and the approximation derived as above is substantially correct.

The width of the section of mirror is dependent upon the generating angle $a$, as given in Equation (365) and therefore each zone should contain a different number of mirrors. It will be observed that the additional width due to the size of the light source, as given in Equations (364) and (365), has an equal influence on the two dimensions of the sections, and therefore no influence at all upon their relative values in the same zone. Substituting the numerical values previously obtained for the central angles, $a$, $b$, $c$, etc. the values of $p_a$, $p_b$, etc. are found to be 360 deg. 60 deg. 38 deg. and 40 deg. Dividing these widths into 360 deg. the number of mirrors in the successive zones are found to be 1, 6, 9, and 9. The general rule is that a single mirror suffices in all cases to cover the apex of the paraboloid, and the number of mirrors reaches a maximum at 90 deg. and then decreases to a theoretical single mirror when the edge of the paraboloid is at infinity, that is, when the generating angle approaches the hypothetical condition of equaling 180 deg.

TABLE XXII.—*Angular width and length of sections for greatest uniformity of beam (15 deg. source).*

| Zone No. | From Deg. | To Deg. | Center Deg. | Length Deg. | Source Deg. | Beam Deg. | Meridian Deg. | Mirrors in zone. |
|---|---|---|---|---|---|---|---|---|
| 1 | −15 | +15 | 0 | 30 | 15 | 45 | 360 | 1 |
| 2 | +15 | +46 | 31 | 31 | 14 | 45 | 60 | 6 |
| 3 | +46 | +80 | 63 | 34 | 11 | 45 | 38 | 9 |
| 4 | +80 | +119 | 100 | 39 | 6 | 45 | 40 | 9 |

In the construction of a mirror from the above data it will be seen that a practical thing to do is to use eight sections, or perhaps ten, in the three outer zones. This would make the mirror easier to construct, and it would not reduce the number of active sections or the central beam intensity. The following table gives some of the angles in the simplified design:—

TABLE XXIII.—*Angular width of sections in simplified design.*

| Zone No. | Eight mirrors per zone (meridian sagittal angles) | | | | Ten mirrors per zone (meridian sagittal angles) | | | |
|---|---|---|---|---|---|---|---|---|
| | Angles | Effect | Source | Total | Angles | Effect | Source | Total |
| 1 | 360 | 30 | 15° | 45.0° | 360 | 30 | 15.0° | 45.0° |
| 2 | 45 | 23 | 14.4° | 37.4° | 36 | 18 | 14.4° | 32.4° |
| 3 | 45 | 40 | 11.0° | 51.0° | 36 | 32 | 11.0° | 43.0° |
| 4 | 45 | 44 | 6.2° | 50.2° | 36 | 35 | 6.2° | 41.2° |

There are here three designs to choose from, and the choice will be influenced by the beam formation, which includes such factors as uniformity of intensity, width and central intensity. These factors can best be evaluated after the beam characteristic has been determined, as will appear.

(*2*) *Disk source.*—The proportions of the sections in a mirror to be used with an arc, or disk source, are influenced by the fact that from the outer parts of the mirror the source seems to be elliptical in outline. In making allowance for the width added to the beam by the dimensions of the arc (or monoplane filament) it will be realized that the long axis of the ellipse adds to the spread of light from the ends of the transverse axis of the section, while the short axis adds to the spread due to the length of the section in the meridian plane.

The minor axis of the ellipse is equal to the major axis reduced by the factors $\cos a$, $\cos b$, etc. where $a$, $b$, etc. are the angles from the vertex, and Equations (364) and (365) therefore become, for a disk source $$\left. \begin{aligned} W_1 &= l_a + s_o \cos^2 \frac{a}{2} \cos a \\ &= l_b + s_o \cos^2 \frac{b}{2} \cos b \\ &= l_c + s_o \cos^2 \frac{c}{2} \cos c \end{aligned} \right\} \text{degrees} \quad (366)$$

etc. and $$\left. \begin{aligned} W_w &= p_a \sin e\, a + s_o \cos^2 \frac{a}{2} \\ &= p_b \sin e\, b + s_o \cos^2 \frac{b}{2} \\ &= p_c \sin e\, c + s_o \cos^2 \frac{c}{2} \end{aligned} \right\} \text{degrees} \quad (367)$$

etc.

In the Equation (366) above, the factors $\cos a$, $\cos b$ etc., are the factors for a disk-like source of light; other forms of light source have other factors and therefore $f$ may be substituted for $\cos a$, $\cos b$, etc. in a general Equation for any light source.

We have seen in Equation (362) that $W_w = W_1$; then substituting $f$ for $\cos a$ in (366) above, we find from (366) and (367) that:

$$p_a \sin a + s_o \cos^2 \frac{a}{2} = l_a + s_o \cos^2 \frac{a}{2} (f) \text{ degrees},$$

and $$p_a \sin a = l_a + s_o \cos^2 \frac{a}{2} (f) - s_o \cos^2 \frac{a}{2} \text{ degrees},$$

and $$p_a = \frac{l_a + s_o \cos^2 \frac{a}{2} (f - l)}{\sin a} \text{ degrees} \quad (367-a)$$

This final Equation (367—a) is then the basic equation for a reflector according to the present invention.

It should be noted that the size of the source plays a part in the relative dimensions of the sections because the factors of $s_o$ are not the same in Equations (366) and (367) and in this respect the design will differ from that for a spherical source.

*Chord or tangent?*

In the sectional view in Fig. 3 the tangential mirrors are seen to leave open joints at the ends of the sections. This is not a desirable form of construction and if an attempt is made to bring the ends together the optical adjustment of the zones will be destroyed. It is therefore necessary to find some other method of construction. The basic point in determining the size and position of each section is its point of tangency to the generating paraboloid. If, however, we change our method of approach and assume the junction points to be on the paraboloid, then there is no point of tangency and the mathematical relations are altered. This construction on the basis of chords is much to be preferred and is one often used in practice.

The equation for determining the angular width and length of the sections in order to secure uniformity remain unaltered when dealing with chords in place of tangents, but as will be seen later, a slightly different interpretation must be given to the angles and a different value is found for the focal length.

*Use of chords.*

Mirror sections of 30 deg. lengths and bounded by meridian planes spaced 30 deg. are shown in Fig. 4 along with the generating paraboloid. Only the corners of the sections touch the paraboloid and the ends of the sections are chords or circles, while the edges are chords of the paraboloid. The optical properties of the center line of each section are of prime importance and the adjustment of section and light source must be made from the data of the center line.

The height, or $y_1$, value of a point on the center of the end of a section of width $p$ deg. is $$y_1 = y \cos \frac{p}{2} \quad (368)$$

as illustrated in Fig. 5, and if all zones contain the same number of mirrors then $p$ is a common angle for all, and the relation between $y$ and $y_1$ is constant for all parts of the paraboloid. Placing this value of $y_1$ in the equation of the parabola, we get $$\frac{y_1^2}{\cos^2 \frac{p}{2}} = 4Fx \quad (369)$$

$$y_1^2 = 4Fx \cos^2 \frac{p}{2}$$

and this is the equation of a new parabola that passes through the junction points of the various center lines. The focal length of the derived parabola is $$F_1 = F \cos^2 \frac{p}{2} \quad (370)$$

and the light source should therefore be moved toward the vertex accordingly. The generating and derived parabolas have a common vertex and the origin for measuring $F$ and $F_1$ is a common origin.

If a chord in a meridian plane is investigated for reflection of light originating at the focus it will be found that the axis of the reflected beam is obviously not that best adapted for giving the best concentration of light, and the equation derived below gives a further shift of the focal point to bring one particular mirror zone into optical adjustment.

In Fig. 6 the parabola is the one derived to pass through the ends of the meridian center lines, and the section extends from the vertex to a point $(x_1, y_1)$ at an angle $l$ from the axis. Then $$x_1 = \tan^2 \frac{l}{2} \quad (371)$$

and $$y_1 = 2 \tan \frac{l}{2} \quad (372)$$

Let $\frac{b}{2}$ be the angle between the chord from $(0,0)$ to $(x_1, y_1)$ and the tangent at the vertex, then $$\tan \frac{b}{2} = \frac{x_1}{y_1} = \frac{\tan^2 \frac{l}{2}}{2 \tan \frac{l}{2}} \quad (373)$$

$$= \frac{1}{2} \tan \frac{l}{2} \quad (374)$$

Let the light source be placed at some point $S$ at a distance $F_2$ from the vertex (Fig. 6) so that the entire chord subtends an angle $2b$. When this condition is fulfilled the rays reflected at the $(0,0)$ point will have a downward slope equal to the upward slope of the ray reflected at $(x_1, y_1)$. The downward slope is seen to be fixed and equal to $b$ degrees because the ray striking at $(0,0)$ does so at zero angle is deflected by twice the angle between the mirrors and the plane at the vertex, that is, twice $b$.

Referring to Fig. 6, we can write $$(KF_1 - x_1) \tan 2b = y_1$$

$$KF_1 = \frac{y_1 + x_1 \tan 2b}{\tan 2b} \quad (375)$$

By the aid of Equation (374) angle $b$ can be expressed in terms of angle $l$, and these values substituted in Equation (375) give an infinite series.

$$KF_1 = 1 - \frac{1}{2} \tan^2 \frac{l}{2} - 1/4 \tan^4 \frac{l}{2} \quad (376)$$

If this value for the new focal length is substituted in the expression for the generating parabola we get $$F_2 = \cos^2 \frac{p}{2} (1 - \frac{1}{2} \tan^2 \frac{l}{2} - \frac{1}{4} \tan^4 \frac{l}{2} \ldots)F \quad (377)$$

for the correct focal point for the first zone of mirrors.

It will be noticed that the equation for $F_2$ was derived for a zone extending from the axis. The equation cannot, therefore, be expected to hold accurately for all zones, but a number of trials have shown it to be as correct as need be for the design of this type of mirror, where 1 deg. plus or minus is not of great importance.

In Fig. 7 several curves are given for the focal length $F_2$ when $l$ and $p$ vary from zero to forty degrees. A mirror section 80 deg. by 30 deg. reduces the focal length 91.5 per cent of the focal length of the generating parabola, while sections 40 deg. by 40 deg. reduce it to 85 per cent. These reductions are of considerable importance because it is customary to make the focal length as small as will permit the use of some predetermined lamp bulb, and unless proper account is taken of the difference between $F$ and $F_2$ it will not be possible to bring the lamp to the focal point of the finished reflector.

In case the several mirror zones contain different numbers of sections it would seem the wise thing to take the combination of $p$ and $l$ that gives the smallest value of $F_2$, and thus guard against the lamp bulb coming against the mirror when focused. An additional reason is the loss of focusing space due to the clips or other fasteners that hold the mirrors in place.

If the light source is shifted to the new focal length $F_2$, all the angular relations will be altered in some degree. The purpose of the change is to make the upward and downward reflection equal for the top and bottom edges of the same section, but additions to the upward angle will not be exactly balanced by the lessening of the downward angle and the total width of the beam will be slightly altered. This alteration is in the nature of a second order correction, (that for the size of the light source being of the first order) and is not of sufficient size to warrant going through the design a second time in order to compensate for it.

By referring to Figures 11 and 12 it will be seen how the reflector of the invention is divided into zones and how each zone is located between parallel planes, each zone containing a number of panels located about the axis of the reflector. From Fig. 11 it will be readily seen that the numbers of panels are not the same in all of the zones. It will be seen that the transverse angular dimensions of the panels in the first zone in Fig. 11 are different from the transverse angular dimensions of the panels in the second zone, and that the transverse angular dimensions of the panels in the third zone are different from similar dimensions in the panels of the second zone. There is a special case, however, in which the number of panels in two adjacent zones is the same as indicated in Fig. 13. This is the case when sin $b$ of Equation 367 is equal to sin $c$ of the same equation. This only occurs, however, when, for example, $c$ exceeds 90 degrees by the same amount that $b$ falls short of 90 degrees.

If in Fig. 13 an axial plane 14—14 is passed through the centers of the panels radially disposed along the different zones, as indicated in Fig. 13, the plane will cut the panels along lines which in Fig. 14 are shown as chords. Now the ends of these chords may be used to determine a second or derivative paraboloid shown in Fig. 14 with a second or derived focal distance $F_1$. This new focal distance is the focal distance $F_1$ of Fig. 6 from which the operating focal length $F_2$ (Fig. 6) is obtained.

What I claim as new and desire to secure by Letters Patent of the United States, is,—

1. A reflector composed of flat panels assembled about an axis and having a general contour of a focalizing surface, each panel having angular dimensions measured about the focal point of the focalizing surface related as follows:

$$p_a = \frac{l_a + S_o(f-1)\cos^2\frac{a}{2}}{\sin a} \text{ (degrees)}$$

where
$l_a$=angle subtended in the longitudinal plane by longitudinal center line of panel,
$P_a$=angle between meridian planes forming sides of panels whose transverse center lines are at an angle $a$ with the axis of the reflector, $s_o$=angle subtended in the transverse plane by the light source, the point of measurement being the intersection of the two center lines of the panel,
$a$=angle between axis of complete reflector and the intersection of the two center lines of the panel,
$f$=a factor to compensate for foreshortening of the source of light.

2. A projector comprising in combination with a light source a plurality of reflecting elements assembled about the axis of a focalizing surface for producing a light beam, each reflecting element being polygonal and having a plurality of its corners in the focalizing surface, each of said elements having angular length and width equal to the angular length and width respectively of a predetermined distant area along and normal to the axis of the projector to be illuminated by said beam less the angular width of the light source, the angular width of the light source being measured about the central point of the element, the angular length and width of said elements being measured from the focal point of the focalizing surface.

3. A projector comprising in combination with a light source a plurality of reflecting elements assembled about the axis of a focalizing surface for producing a light beam, each element being polygonal and having a plurality of its corners in the focalizing surface, each of said sections having angular length and width equal to the angular length and width respectively of a predetermined distant area along and normal to the axis of the projector to be illuminated by said beam less the angular width of the light source, the angular width of the light source being measured about the central point of the element, the angular length and width of said elements being measured from the focal point of the focalizing surface, each of said elements being flat.

4. A reflector formed by a plurality of flat sections, a plurality of flat reflector panels adjusted to be in internal contact with a focalizing curve, the length and width of said sections being so chosen that the divergence of the rays originating in the focal region of the focalizing curve is substantially equal for all sections, said panels being also arranged about the axis of the focalizing surface each panel having angular length $l_a$ and angular width $p_a$ related as follows:

$$p_a = \frac{l_a + s_o \cos^2\frac{a}{2}(f-1)}{\sin a} \text{ (degrees)}$$

where
$l_a$=angle subtended in the longitudinal plane by longitudinal center line of panel,
$p_a$=angle between meridian planes forming sides of panels whose transverse center lines are at an angle $a$ with the axis of the reflector, $s_o$ = angle subtended in the transverse plane by the light source, the point of measurement being the intersection of the two center lines of the panel, $a$ = angle between axis of complete reflector and the intersection of the two center lines of the panel, $f$ = a factor to compensate for foreshortening of the light source (ordinarily $f = \cos a$ for a disk-like source of light).

5. A reflector comprising in combination with a light source, a plurality of reflecting elements assembled about an axis in the form of a focalizing unit about said axis, each reflecting element having an angular length $l_a$ and an angular width $P_a$ equal to the angular length and width respectively, about the focal point of the unit, of a predetermined area to be illuminated less the angular width of the light source, the angular width of the light source being measured about the central point of the element, the angular length $l_a$ and the angular width $P_a$ being so related that $$l_a + S_o f \cos^2 \frac{a}{2} = P_a \sin a + S_o \cos^2 \frac{a}{2}.$$

6. A projector comprising in combination with a light source, a plurality of reflecting elements assembled about the axis of a focalizing surface for producing a light beam, each section being polygonal and having a plurality of its corners in the focalizing surface, each of said sections having angular length $l_a$ and angular width $P_a$ equal to the angular length and width respectively of a predetermined distant area along and normal to the axis of the projector to be illuminated by said beam less the angular width of the light source, the angular width of the light source being measured about the central point of the element, the angular length and width of said elements being measured from the focal point of the focalizing surface, the angular length $l_a$ and the angular width $P_a$ being so related that $$l_a + S_o f \cos^2 \frac{a}{2} = P_a \sin a + S_o \cos^2 \frac{a}{2}.$$

In witness whereof, I have hereunto set my hand this 28th day of November, 1925.

FRANK A. BENFORD.

CERTIFICATE OF CORRECTION.

Patent No. 1,726,379.               Granted August 27, 1929, to

FRANK A. BENFORD.

It is hereby certified that error appears in the printed specification of the above numbered patent requiring correction as follows: Page 1, line 90, for the word "radially" read "radically"; and that the said Letters Patent should be read with this correction therein that the same may conform to the record of the case in the Patent Office.

Signed and sealed this 15th day of October, A. D. 1929.

(Seal)                                          M. J. Moore,
                                               Acting Commissioner of Patents.

lines are at an angle $a$ with the axis of the reflector, $s_o$ = angle subtended in the transverse plane by the light source, the point of measurement being the intersection of the two center lines of the panel, $a$ = angle between axis of complete reflector and the intersection of the two center lines of the panel, $f$ = a factor to compensate for foreshortening of the light source (ordinarily $f = \cos a$ for a disk-like source of light).

5. A reflector comprising in combination with a light source, a plurality of reflecting elements assembled about an axis in the form of a focalizing unit about said axis, each reflecting element having an angular length $l_a$ and an angular width $P_a$ equal to the angular length and width respectively, about the focal point of the unit, of a predetermined area to be illuminated less the angular width of the light source, the angular width of the light source being measured about the central point of the element, the angular length $l_a$ and the angular width $P_a$ being so related that $$l_a + S_o f \cos^2 \frac{a}{2} = P_a \sin a + S_o \cos^2 \frac{a}{2}.$$

6. A projector comprising in combination with a light source, a plurality of reflecting elements assembled about the axis of a focalizing surface for producing a light beam, each section being polygonal and having a plurality of its corners in the focalizing surface, each of said sections having angular length $l_a$ and angular width $P_a$ equal to the angular length and width respectively of a predetermined distant area along and normal to the axis of the projector to be illuminated by said beam less the angular width of the light source, the angular width of the light source being measured about the central point of the element, the angular length and width of said elements being measured from the focal point of the focalizing surface, the angular length $l_a$ and the angular width $P_a$ being so related that $$l_a + S_o f \cos^2 \frac{a}{2} = P_a \sin a + S_o \cos^2 \frac{a}{2}.$$

In witness whereof, I have hereunto set my hand this 28th day of November, 1925.

FRANK A. BENFORD.

CERTIFICATE OF CORRECTION.

Patent No. 1,726,379.  Granted August 27, 1929, to

FRANK A. BENFORD.

It is hereby certified that error appears in the printed specification of the above numbered patent requiring correction as follows: Page 1, line 90, for the word "radially" read "radically"; and that the said Letters Patent should be read with this correction therein that the same may conform to the record of the case in the Patent Office.

Signed and sealed this 15th day of October, A. D. 1929.

(Seal)

M. J. Moore,
Acting Commissioner of Patents.